US007222145B2

(12) United States Patent
Walster et al.

(10) Patent No.: US 7,222,145 B2
(45) Date of Patent: May 22, 2007

(54) METHOD AND APPARATUS FOR SOLVING SYSTEMS OF EQUATIONS IN FIXED-POINT FORM

(75) Inventors: G. William Walster, Cupertino, CA (US); Ramon E. Moore, Worthington, OH (US)

(73) Assignee: Sun Microsystems, Inc., Santa Clara, CA (US)

( * ) Notice: Subject to any disclaimer, the term of this patent is extended or adjusted under 35 U.S.C. 154(b) by 736 days.

(21) Appl. No.: 10/211,624

(22) Filed: Aug. 2, 2002

(65) Prior Publication Data

US 2003/0110195 A1    Jun. 12, 2003

Related U.S. Application Data

(60) Provisional application No. 60/338,884, filed on Dec. 7, 2001.

(51) Int. Cl.
G06F 7/38 (2006.01)
(52) U.S. Cl. .................................. 708/446
(58) Field of Classification Search .............. 708/446, 708/200, 490
See application file for complete search history.

(56) References Cited

U.S. PATENT DOCUMENTS

| | | | | |
|---|---|---|---|---|
| 3,789,203 A | * | 1/1974 | Catherall et al. | 708/446 |
| 5,293,461 A | * | 3/1994 | Grudic et al. | 700/262 |
| 6,574,650 B1 | * | 6/2003 | Aoki | 708/446 |

OTHER PUBLICATIONS

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.
R. B. Kearfott, Algorithm 763: Interval Arithmetic: A Fortran 90 Module for an Interval Data Type, ACM Trans. Math. Software, 22, vol. 4, 1996, pp. 385-392. http://interval.louisiana.edu/preprints.html.
R. B. Kearfott and M. Novoa III, "Algorithm 681: INTBIS, A portable interval Newton/bisection package", ACM Trans. Math Software, vol. 16, No. 2, pp. 152-147. http://www.netlib.org/toms/681.
R. B. Kearfott, M. Dawande, K.S. Du, and C. Hu, "Algorithm 77: INTLIB: A Portable Fortran 77 Interval Standard Function Library," ACM Trans. Math. Software, 20, vol. 4, Dec. 1994, pp. 447-458.
R. B. Kearfott and G.W. Walster, "On Stopping Criteria in Verified Nonlinear Systems or Optimization Algorithms," ACM Trans. Math. Software, 26, vol. 3, Sep. 2000, pp. 323-351. The publication itself says Received: Jul. 1999; revised: Mar. 2000; accepted: Mar. 2000. http://interval.louisiana.edu/preprints.html.
R.E. Moore and S.T. Jones "Safe Starting Regions for Iterative Methods", SIAM Journal on Numerical Analysis, vol. 14, No. 6 (Dec. 1977), pp. 1051-1065.

(Continued)

*Primary Examiner*—Meng-Al T. An
*Assistant Examiner*—Chat C. Do
(74) *Attorney, Agent, or Firm*—Park, Vaughan & Fleming, LLP

(57) ABSTRACT

One embodiment of the present invention provides a system for solving a system of equations in fixed-point form. During operation, the system receives a representation of the equations in fixed-point form and stores the representation a computer memory. Next, the system reduces the dimension of the system of equations, when possible, by eliminating variables in the system of equations to produce a reduced system of equations. The system then performs interval intersections based on the Fixed Point theorem to reduce the size of a box containing solutions to the reduced system of equations. In a variation on this embodiment, the system additionally applies interval techniques to find solutions to the system of equations, when such solutions exist.

18 Claims, 9 Drawing Sheets

OTHER PUBLICATIONS

A. Neumaier, "The Enclosure of Solutions of Parameter-Dependent Systems of Euqations," Cambridge University Press, Cambridge, 1990, ISBN: 0-12-505630-3, Reliability in Computing pp. 269-286.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Mathematics, Elsevier, 1994, pp. 63-136.

Pascal Van Hentenryck, Vijay Saraswat and Yves Deville, "Design, Implementation, and Evaluation of the Constraint Language cc (FD)," Elsevier Science, Inc., 1998.

* cited by examiner $X \equiv [\underline{x}, \bar{x}] \equiv \{x \in \Re^* | \underline{x} \leq x \leq \bar{x}\}$ $Y \equiv [\underline{y}, \bar{y}] \equiv \{y \in \Re^* | \underline{y} \leq y \leq \bar{y}\}$ (1) $X+Y = [\downarrow \underline{x}+\underline{y}, \uparrow \bar{x}+\bar{y}]$ (2) $X-Y = [\downarrow \underline{x}-\bar{y}, \uparrow \bar{x}-\underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \Re^*$, if $0 \in Y$

FIG. 5

METHOD AND APPARATUS FOR SOLVING SYSTEMS OF EQUATIONS IN FIXED-POINT FORM

RELATED APPLICATION

This application hereby claims priority under 35 U.S.C. §119 to U.S. Provisional Patent Application No. 60/338,884, filed on Dec. 7, 2001, entitled "Sparse Systems in Fixed Point Form," by inventors G. William Walster and Ramon E. Moore.

BACKGROUND

1. Field of the Invention

The present invention relates to performing arithmetic operations on interval operands within a computer system. More specifically, the present invention relates to a method and an apparatus for using a computer system to solve systems of equations in fixed-point form.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to find the roots of a nonlinear equation. This can be accomplished using Newton's method. The interval version of Newton's method works in the following manner. From the mean value theorem, $$f(x)-f(x^*)=(x-x^*)f'(\xi),$$

where $\xi$ is some generally unknown point between x and $x^*$. If $x^*$ is a zero of f, then $f(x^*)=0$ and, from the previous equation, $$x^*=x-f(x)/f'(\xi).$$

Let X be an interval containing both x and $x^*$. Since $\xi$ is between x and $x^*$, it follows that $\xi \in X$. Moreover, from basic properties of interval analysis it follows that $f'(\xi) \in f'(X)$. Hence, $x^* \in N(x,X)$ where $$N(x,X)=x-f(x)/f'(X).$$

Temporarily assume $0 \notin f'(X)$ so that N(x,X) is a finite interval. Since any zero of f in X is also in N(x,X), the zero is in the intersection $X \cap N(x,X)$. Using this fact, we define an algorithm for finding $x^*$. Let $X_0$ be an interval containing $x^*$. For n=0, 1, 2, . . . , define $$x_n=m(X_n)$$

$$N(x_n,X_n)=x_n-f^1(x_n)/f'(X_n)$$

$$X_{n+1}=X_n \cap N(x_n, X_n),$$

wherein m(X) is the midpoint of the interval X, and the notation, $f'(x_n)$ makes explicit the fact that evaluating f at the point $x_n$ must be done using interval arithmetic. We call $x_n$ the point of expansion for the Newton method. It is not necessary to choose $x_n$ to be the midpoint of $X_n$. The only requirement is that $x_n \in X_n$ to assure that $x^* \in N(x_n, X_n)$. However, it is convenient and efficient to choose $x_n=m(X_n)$. Note that the roots of an interval equation can be intervals rather than points when the equation contains non-degenerate interval constants or parameters.

The interval version of Newton's algorithm for finding roots of nonlinear equations is designed to work best "in the small" when nonlinear equations are approximately linear. For large intervals containing multiple roots, the interval Newton algorithm splits the given interval into two sub-intervals that are then processed independently. By this mechanism all the roots of a nonlinear equation can be found.

The task of solving systems of equations often requires large amounts of computer time and memory. This is especially true for systems of nonlinear equations. These demands depend upon many things, one of which is the size of the domain to be searched for solutions.

What is needed is a method and an apparatus for reducing the domain to be searched for solutions during the process of solving a large system of equations.

SUMMARY

One embodiment of the present invention provides a system for solving a system of equations in fixed-point form. During operation, the system receives a representation of the equations in fixed-point form and stores the representation a computer memory. Next, the system reduces the dimension of the system of equations, when possible, by eliminating variables in the system of equations to produce a reduced system of equations. The system then performs interval intersections based on the Fixed Point theorem to reduce the size of a box containing solutions to the reduced system of equations.

In a variation on this embodiment, the system additionally applies interval techniques to find solutions to the system of equations, when such solutions exist. For example, this may involve applying term consistency over a subbox X, and excluding any portion of the subbox X that violates term consistency.

In a variation on this embodiment, the system reduces the dimension of the system of equations by identifying cycles in the system of equations and then identifying a generating set of variables that covers all cycles in the system of equations. Next, the system forms the reduced system of equations by expressing the system of equations in terms of the generating set. During this process, the system can reorder the system of equations so that equations that are part of the same irreducible block are contiguous.

In a variation on this embodiment, performing the interval intersections involves performing component-wise interval intersections for equations in the reduced system of equations. It may also involve updating interval arguments as soon as updated values for the interval arguments are available.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
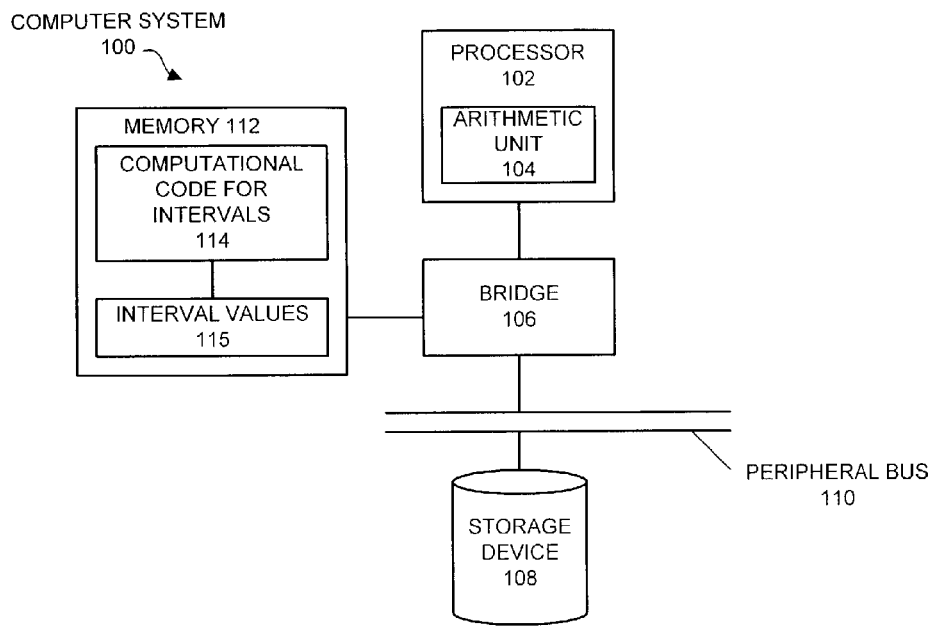
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
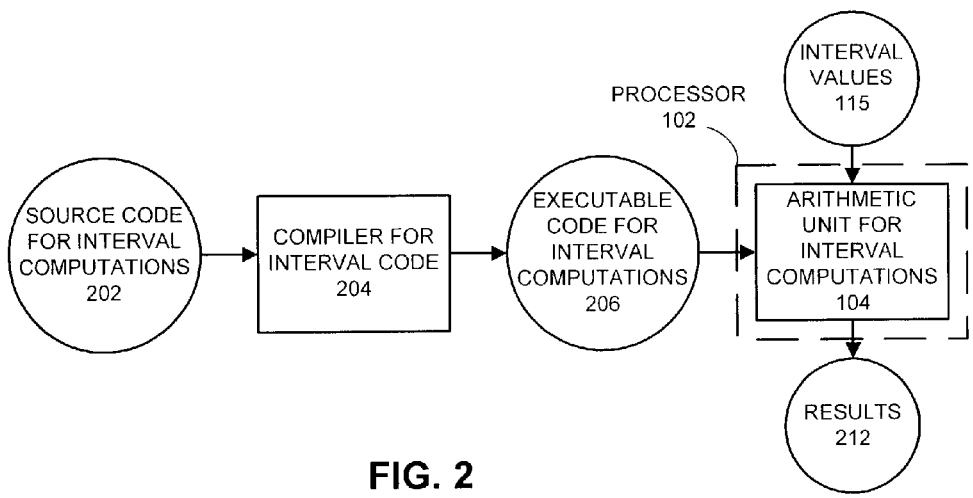
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
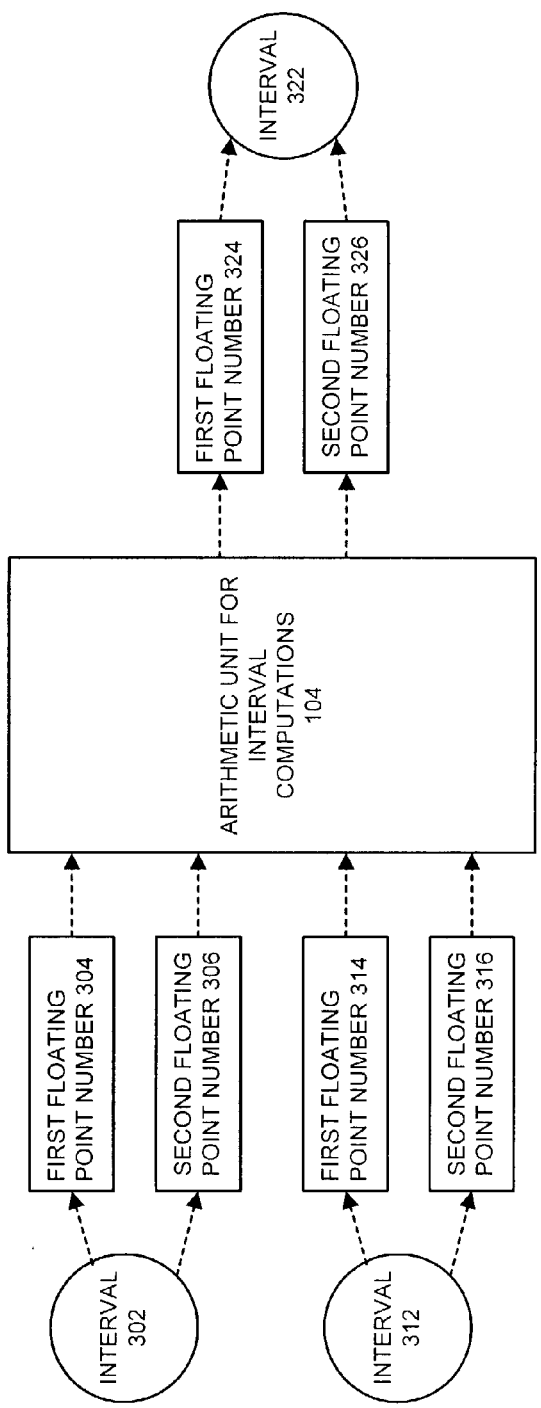
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
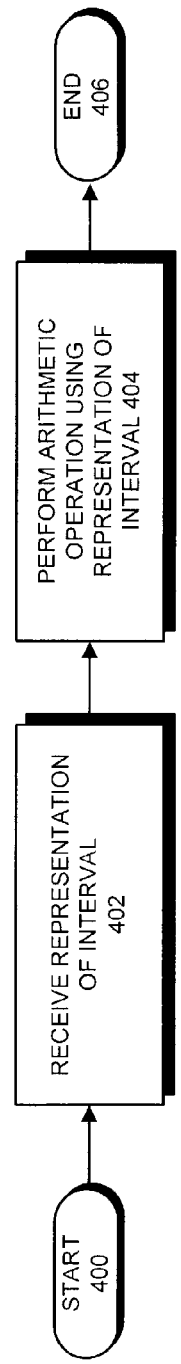
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Interval Version of Newton's Method for Systems of Nonlinear Equations

Figure 6:
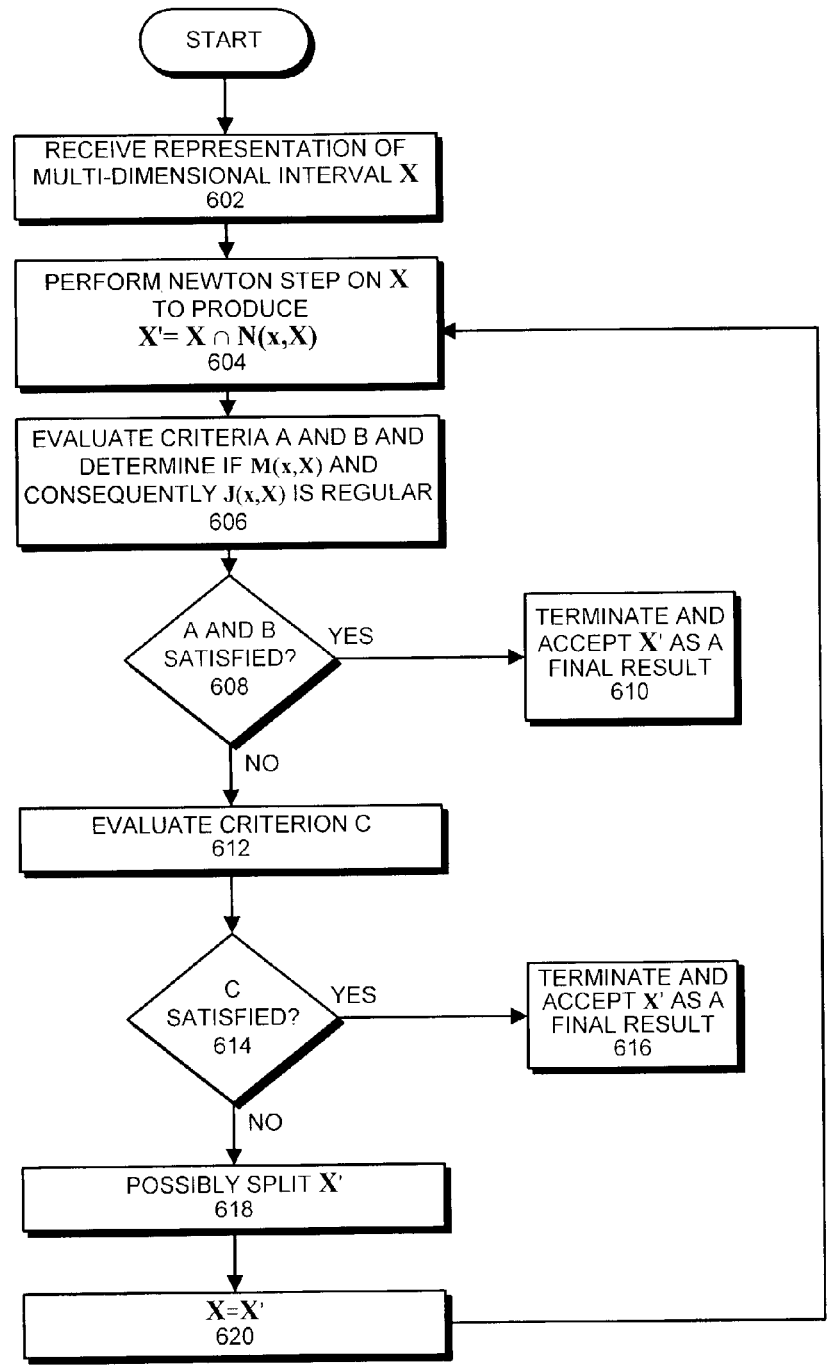
FIG. 6 illustrates a process of solving for zeros of a vector function that specifies a system of nonlinear equations using the interval Newton method.

FIG. 6 illustrates the process of using the interval Newton method without the present invention to solve for zeros of a vector function that defines a system of nonlinear equations. The system starts with a multi-variable function f(x)=0, wherein x is a vector $(x_1, x_2, x_3, \ldots x_n)$, and wherein f(x)=0 represents a system of equations $f_1(x)=0$, $f_2(x)=0$, $f_3(x)=0, \ldots, f_n(x)=0$.

Next, the system receives a representation of a box X (step 602). In one embodiment of the present invention, for each dimension, i, the representation of $X_1$ includes a first floating-point number, $a_1$, representing the left endpoint of $X_1$ in the i-th dimension, and a second floating-point number, $b_1$, representing the right endpoint of $X_1$.

The system then performs a Newton step on X, wherein the point of expansion is typically x=m(X) the midpoint of the box X, to compute a resulting interval X'=X∩N(x,X) (step 604).

Next, the system evaluates termination criteria A and B, which relate to the size of the box X' and the function f, respectively (step 606). Criterion A is satisfied if the width of the interval X', w(X'), is less than $\epsilon_X$ for some user-specified $\epsilon_X$>0, wherein w(X') is be defined as the maximum width of any component $X_1$ of the interval X'. Note that $\epsilon_X$ is user-specified and is an absolute criterion. Criterion A can alternatively be a relative criterion w(X')/|X'|<$\epsilon_X$ if the box X' does not contain zero. Moreover, $\epsilon_X$ can be a vector, $\epsilon_X$, wherein there exists a separate component $\epsilon_{X1}$ for each dimension in the box X'. In this case, components containing zero can use absolute criteria, while other components use relative criteria.

Criterion B is satisfied if $\|f\|<\epsilon_F$ for some user-specified $\epsilon_F$>0, wherein $\|f\|=\max(|f_1(X')|, |f_2(X')|, |f_3(X')|, \ldots, |f_n(X')|)$. Note that as with $\epsilon_X$, element-specific values $\epsilon_{F1}$ can be used, but they are always absolute.

However they are defined, if criteria A and B are satisfied, the system terminates and accepts X' as the final bounding box for the zeros of f (step 610). Otherwise, if either criterion A or criterion B is not satisfied, the system proceeds to evaluate criterion C (step 612).

Criterion C is satisfied if three conditions are satisfied. A first condition is satisfied if zero is contained within $f^1(x)$, wherein x is a point within the box X, and wherein $f^1(x)$ is a box that results from evaluating f(x) using interval arithmetic. Note that performing the interval Newton step in step 604 involves evaluating f(x) to produce an interval result $f^1(x)$. Hence, $f^1(x)$ does not have to be recomputed for criterion C.

A second condition is satisfied if M(x,X)=BJ(x,X) is regular. J(x,X) is the Jacobian (matrix of first order partial derivatives) of the vector function f as a function of the point x in the interval X. B is an approximate inverse of the center of J(x,X). Note that multiplying J(x,X) by B preconditions J(x,X) so it is easier to determine whether J(x,X) is regular. Hence, M(x,X) is referred to as the "preconditioned" Jacobian.

Finally, a third condition is satisfied if X=X'. This indicates that the interval Newton step (in step 604) failed to make progress.

If criterion C is satisfied, the system terminates and accepts X' as a final bounding box for the zeros of f (step 616).

Otherwise, if criterion C is not satisfied, the system returns for another iteration. This may involve splitting X' into multiple intervals to be separately solved if the Newton step has not made sufficient progress to assure convergence at a reasonable rate (step 618). The system then sets X=X' (step 620) and returns to step 604 to perform another interval Newton step.

The above-described process works well if tolerances $\epsilon_X$ and $\epsilon_F$ are chosen "relatively large". In this case, processing stops early and computing effort is relatively small.

Figure 7:
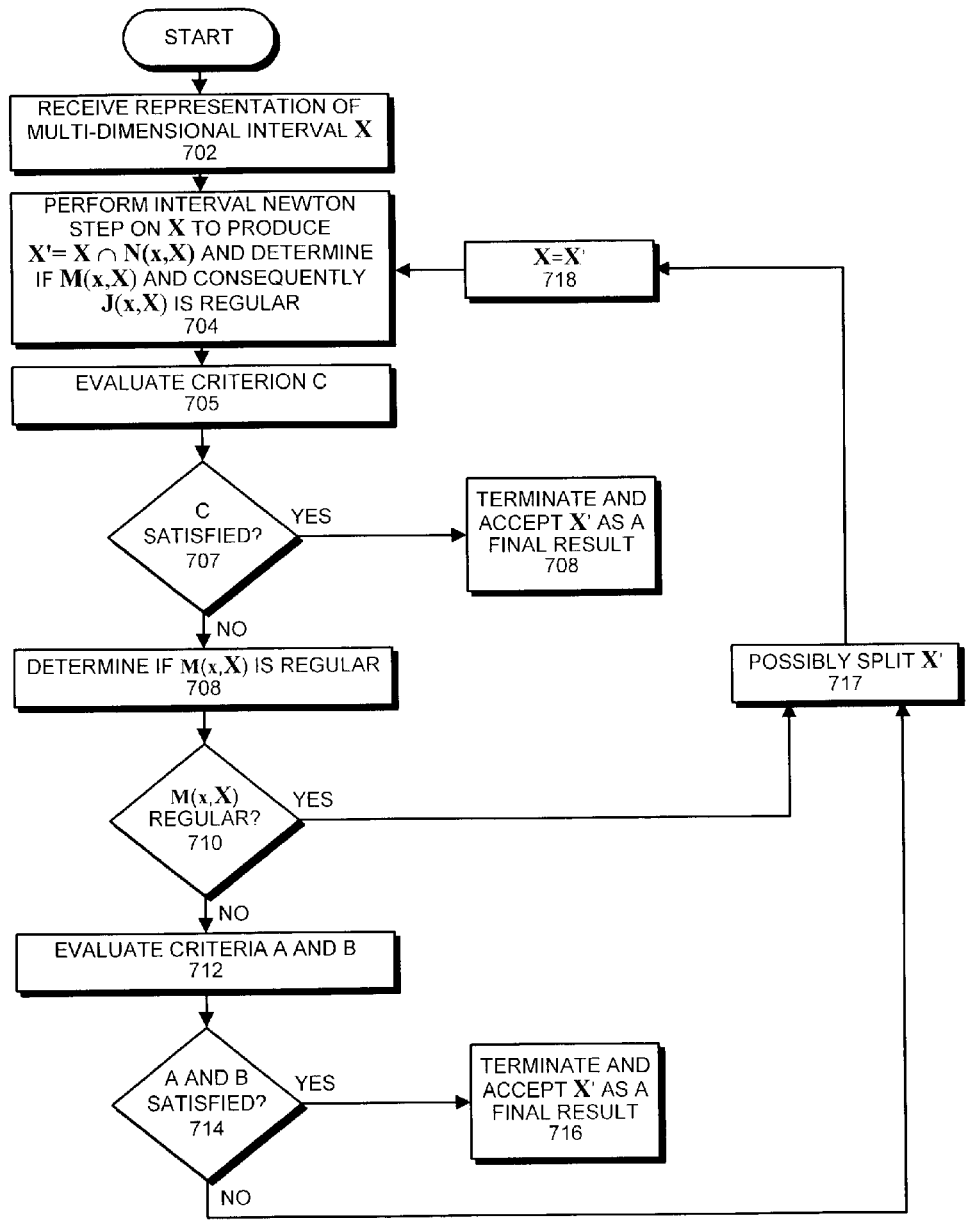
FIG. 7 illustrates another process of solving for zeros of a function that specifies a system of nonlinear equations using the interval Newton method in accordance with an embodiment of the present invention.

Alternatively, the process illustrated in FIG. 7 seeks to produce to best (or near best) possible result for simple zeros, again without the present invention. The system starts with a multi-variable function f(x)=0. Next, the system receives a representation of a box X (step 702). The system then performs a Newton step on X, wherein the point of expansion is x∈X, to compute a resulting interval X'=X∩N(x,X) (step 704).

Next, the system evaluates criterion C (step 705). If criterion C is satisfied, the system terminates and accepts X' as a final bounding box for the zeros of f (step 708). Otherwise, if criterion C is not satisfied, the system proceeds to determine if M(x,X) is regular (step 709).

If M(x,X) is regular, the system returns for another iteration. This may involve splitting X' into multiple intervals to be separately solved if the Newton step has not made sufficient progress to assure convergence at a reasonable rate (step 717). The system also sets X=X' (step 718) before returning to step 704 to perform another interval Newton step.

If M(x,X) is not regular, the system evaluates termination criteria A and B (step 712). If criteria A and B are satisfied, the system terminates and accepts X' as a final bounding box for the zeros of f (step 716). Otherwise, if either criterion A or criterion B is not satisfied, the system returns for another iteration (steps 717 and 718).

Term Consistency

Figure 8:
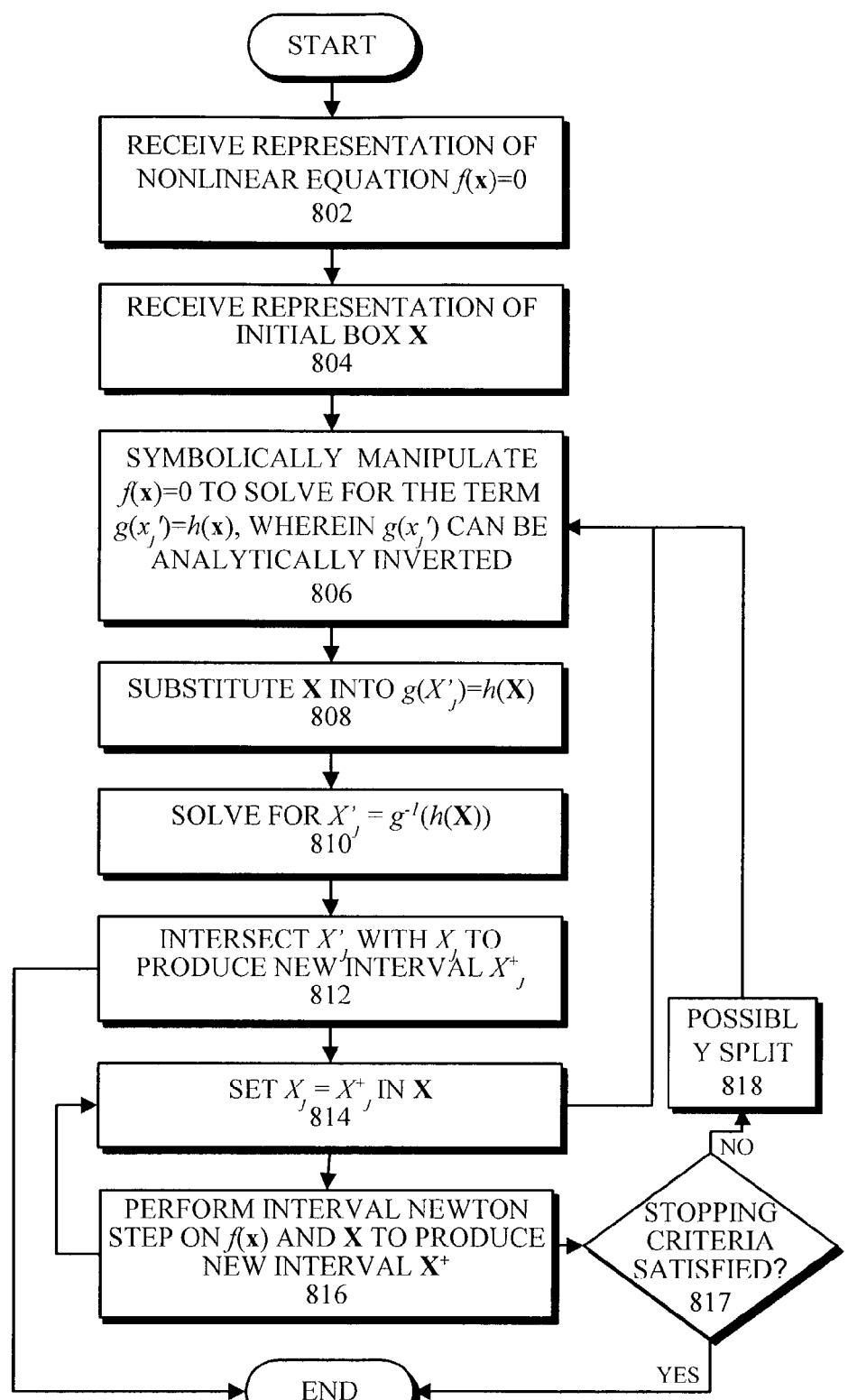
FIG. 8 is a flow chart illustrating the process of finding an interval solution to a single nonlinear equation in accordance with an embodiment of the present invention.

FIG. 8 is a flow chart illustrating the process of solving a single nonlinear equation through interval arithmetic and term consistency in accordance with an embodiment of the present invention. This is the process designed to work well for large boxes X when otherwise the interval Newton method must repeatedly split the given box into sufficiently small subboxes. The system starts by receiving a representation of a nonlinear equation f(x)=0 (step 802), as well as a representation of an initial box X (step 804). Next, the system symbolically manipulates the equation f(x)=0 to solve for a term $g(x_j)$=h(x), wherein the term $g(x_j)$ can be analytically inverted to produce the inverse function $g^{-1}$ (step 806).

Next, the system substitutes the initial box X into h(X) to produce the equation $g(X'_j)$=h(X) (step 808). The system then solves for $X'_j=g^{-1}(h(X))$ (step 810). The resulting interval $X'_j$ is then intersected with the initial interval $X_j$ to produce a new interval $X^+_j$ (step 812).

At this point, the system can terminate. Otherwise, the system can perform further processing. This further processing involves setting $X_j=X_j^+$ in X (step 814) and then either returning to step 806 for another iteration of term consistency on another term of f(x), or by performing an interval Newton step on f(x) and X to produce a new interval $X^+$ (step 816). At this point, if stopping criteria are satisfied (step 817), the system possibly splits the box (step 818) and returns to step 806.

Examples of Applying Term Consistency

For example, suppose f(x)=$x^2$−x+6. We can define g(x)=$x^2$ and h(x)=x−6. Let X=[−10,10]. The procedural step is $(X')^2$=X−6=[−16,4]. Since $(X')^2$ must be non-negative, we replace this interval by [0,4]. Solving for X', we obtain X'=±[0,2]. In replacing the range of h(x) (i.e., [−16,4]) by non-negative values, we have excluded that part of the range h(x) that is not in the domain of $g(x)=x^2$.

Suppose that we reverse the roles of g and h and use the iterative step $h(X')=g(X)$. That is $X'-6=X^2$. We obtain $X'=[6,106]$. Intersecting this result with the interval $[-10,10]$, of interest, we obtain $[6,10]$. This interval excludes the set of values for which the range of g(X) is not in the intersection of the domain of h(X) with X.

Combining these results, we conclude that any solution of $f(X)=g(X)-h(X)=0$ that occurs in $X=[-10,10]$ must be in both $[-2,2]$ and $[6,10]$. Since these intervals are disjoint, there can be no solution in $[-10,10]$.

In practice, if we already reduced the interval from $[-10,10]$ to $[-2,2]$ by solving for g, we use the narrower interval as input when solving for h.

This example illustrates the fact that it can be advantageous to solve a given equation for more than one of its terms. The order in which terms are chosen affects the efficiency. Unfortunately, it is not known how best to choose the best order.

Also note that there can be many choices for g(x). For example, suppose we use term consistency to narrow the interval bound X on a solution of $f(x)=ax^4+bx+c=0$. We can let $g(x)=bx$ and compute $X'=-(aX^4+c)/b$ or we can let $g(x)=ax^4$ and compute $X'=\pm[-(bX+c)/a]^{1/4}$. We can also separate $X^4$ into $x^2*x^2$ and solve for one of the factors $X'=\pm[-(bX+c)/(aX^2)]^{1/2}$.

In the multidimensional case, we may solve for a term involving more than one variable. We then have a two-stage process. For example, suppose we solve for the term $1/(x+y)$ from the function $f(x,y)=1/(x+y)-h(xy)=0$. Let $x \in X=[1,2]$ and $y \in Y=[0.5,2]$. Suppose we find that $h(X,Y)=[0.5,1]$. Then $1/(x+y) \in [0.5,1]$ so $x+y \in [1,2]$. Now we replace y by $Y=[0.5,2]$ and obtain the bound $[-1,1.5]$ on X. Intersecting this interval with the given bound $X=[1,2]$ on x, we obtain the new bound $X'=[1,1.5]$.

We can use X' to get a new bound on h; but this may require extensive computing if h is a complicated function; so suppose we do not. Suppose that we do, however, use this bound on our intermediate result $x+y=[1,2]$. Solving for y as $[1,2]-X'$, we obtain the bound $[-0.5,1]$. Intersecting this interval with Y, we obtain the new bound $Y'=[0.5,1]$ on y. Thus, we improve the bounds on both x and y by solving for a single term off.

The point of these examples is to show that term consistency can be used in many ways both alone and in combination with the interval Newton algorithm to improve the efficiency with which roots of a single nonlinear equation within a large box can be computed. The same is true for systems of nonlinear equations.

Solving a System of Nonlinear Equations

Figure 9A:
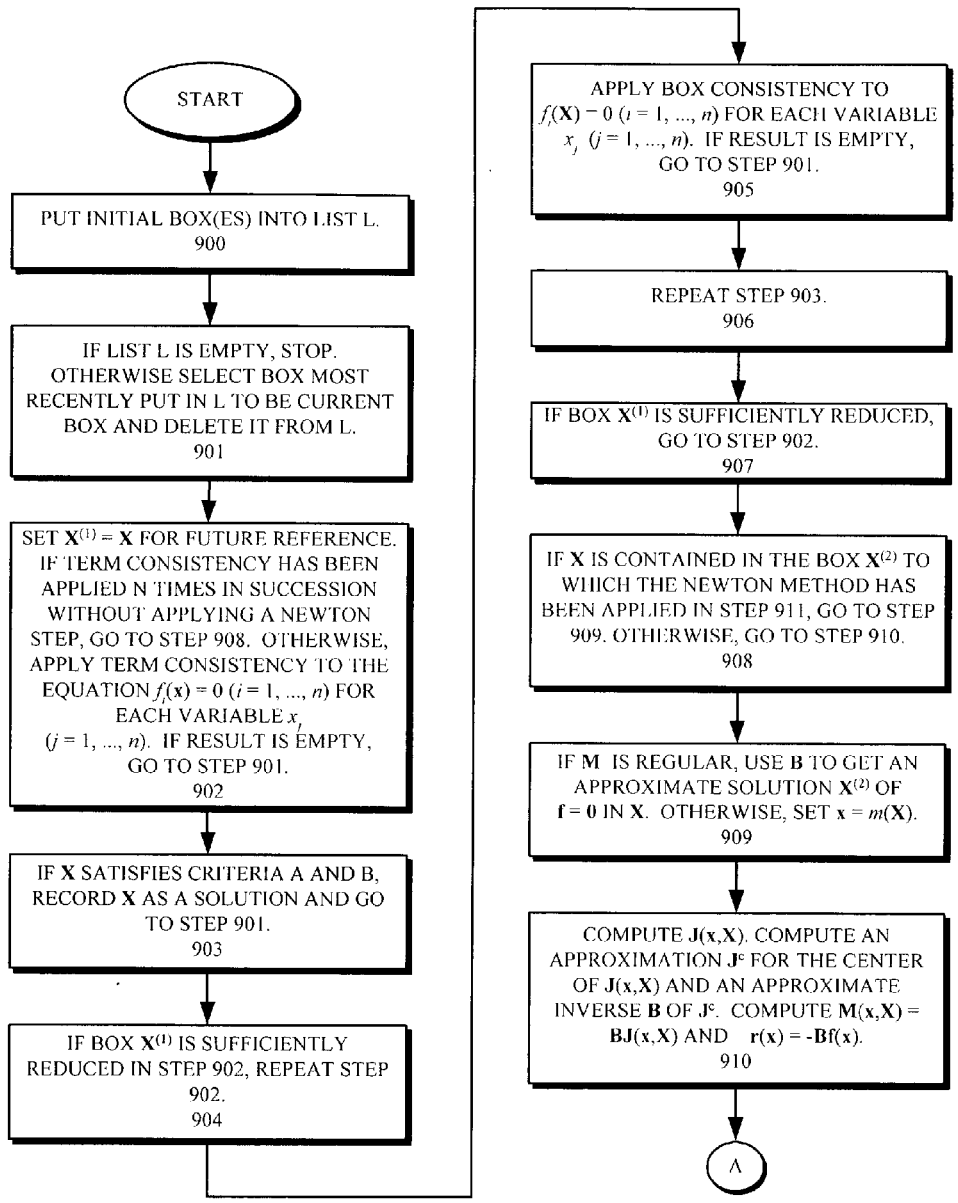
FIG. 9A is portion of a flow chart illustrating the process of finding an interval solution to a system of nonlinear equations in combination with the interval Newton method for finding roots of nonlinear functions in accordance with an embodiment of the present invention.
Figure 9B:
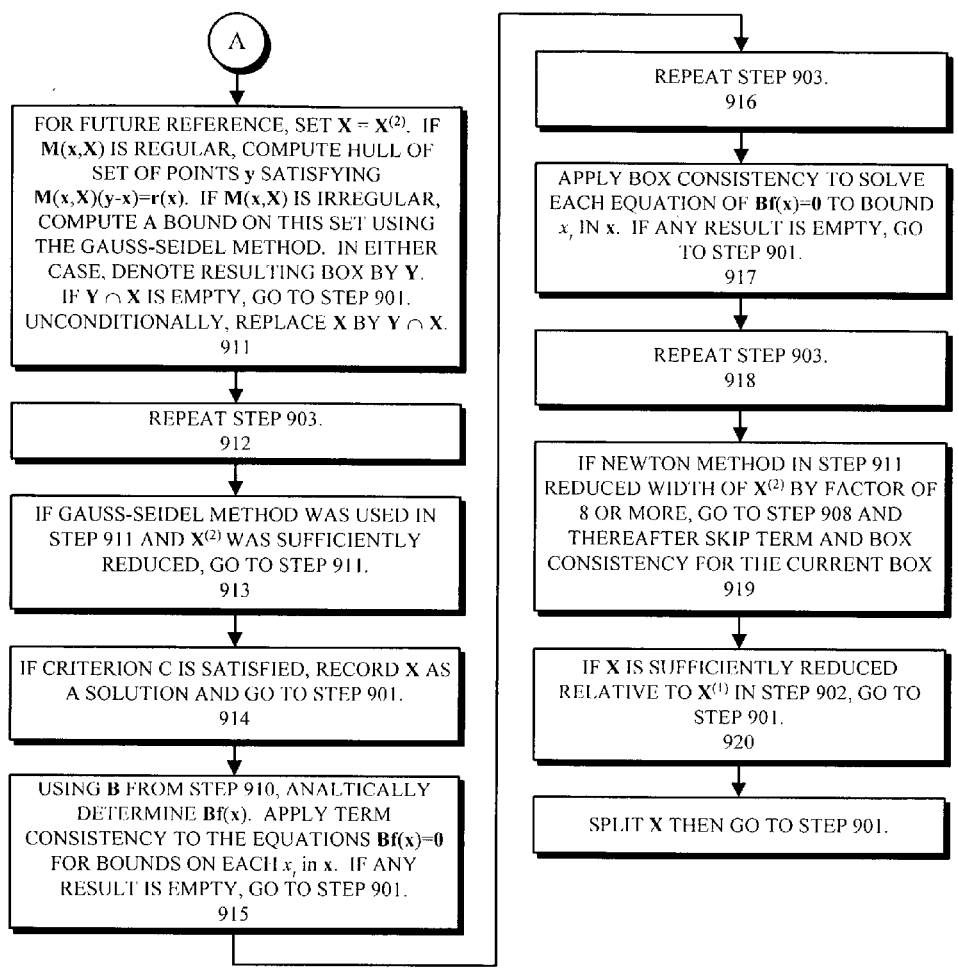
FIG. 9B is another portion of a flow chart illustrating the process of finding an interval solution to a system of nonlinear equations in accordance with an embodiment of the present invention.

FIGS. 9A and 9B present a flow chart illustrating the process of finding an interval solution to a system of nonlinear equations using term consistency in combination with the interval Newton method for finding roots of nonlinear functions in accordance with an embodiment of the present invention.

We assume that an initial box $X^{(0)}$ is given. We seek all zeros of the function f in this box. However, note that more than one box can be given. As the process proceeds, it usually generates various sub-boxes of $X^{(0)}$. These sub-boxes are stored in a list L waiting to be processed. At any given time, the list L may be empty or may contain several (or many) boxes.

The steps of the process are generally performed in the order given below except as indicated by branching. The current box is denoted by X even though it changes from step to step. We assume the tolerances $\epsilon_X$ and $\epsilon_F$, are given by the user.

The system first puts the initial box(es) in the list L (step 900). If the list L is empty, the system stops. Otherwise, the system selects the box most recently put in L to be the current box, and deletes it from L (step 901).

Next, for future reference, the system stores a copy of the current box X. This copy is referred to as $X^{(1)}$. If term consistency previously has been applied n times in succession without applying a Newton step, the system goes to step 908 to do so. (In making this count, the system ignores any applications of box consistency.) Otherwise, the system applies term consistency to the equation $f_1(x)=0$ ($i=1, \ldots, n$) for each variable $x_j$ ($j=1, \ldots, n$). To do so, the system cycles through both equations and variables, updating X whenever the width of an element $X_j$ is reduced. If any result is empty, the system goes to step 901 (step 902).

If X satisfies both Criteria A and B discussed with reference to X' in FIG. 6 above, the system records X as a solution and goes to step 901 (step 903).

If the box $X^{(1)}$ was "sufficiently reduced" in step 902, the system repeats step 902 (step 904). Note that we need a criterion to test when a box is "sufficiently reduced" in size during a step or steps of our process. The purpose of the criterion is to enable us to decide when it is not necessary to split a box, thereby allowing any procedure that sufficiently reduces the box to be repeated. Let X denote a box to which the process is applied in a given step. Assume that X is not entirely deleted by the process. Then either X or a sub-box, say X', of X is returned. It may have been determined that a gap can be removed from one or more components of X'. If so, we may choose to split X' by removing the gap(s). For now, assume we ignore gaps.

We avoid these difficulties by requiring that for some $i=1, \ldots, n$, we have $w(X_1)-w(X_1')<\gamma w(X)$ for some constant $\gamma$ where $0<\gamma<1$. This assumes that at least one component of X is reduced in width by an amount related to the widest component of X. We choose $\gamma y=0.25$.

Thus, we define $D=0.25w(X)-\max_{(1 \leq i \leq n)}(w(X_1)-w(X_1'))$. We say that X is "sufficiently reduced" if $D \leq 0$. The system also unconditionally sets $X=X'$.

Next, the system applies box consistency to the equation $f^1(x)=0$ ($i=1, \ldots, n$) for each variable $x_j$ ($j=1, \ldots, n$). (Box consistency is described in "Global Optimization Using Interval Analysis" by Eldon R. Hansen, Marcel Dekker, Inc., 1992.) If any result is empty, the system goes to step 901 (step 905).

The system next repeats step 903 (step 906). If the current box X is a sufficiently reduced version of the box $X^{(1)}$ defined in step 902, the system goes to step 902 (step 907).

If X is contained in a box $X^{(2)}$ to which the Newton method has been applied in step 911 below, the systems goes to step 909. Otherwise, the system goes to step 910 (step 908).

When the Newton method is applied to $X^{(2)}$ in step 911 below, a preconditioning matrix B and a preconditioned Jacobian M are computed. If M is regular, the system uses B in an "inner iteration procedure" to get an approximate solution x of $f=0$ in X (step 909). (see Hansen, E. R. and Greenberg, R. I., 1983, An interval Newton method, Appl. Math. Comput. 12, 89–98.) Otherwise, if M is not regular, the system sets $x=m(X)$.

Next, the system computes $J(x,X)$ using either an expansion in which some of the arguments are replaced by real (non-interval) quantities (see Hansen, E. R., 1968, On solving systems of equations using interval arithmetic, Math.

Comput. 22, 374–384.) or else using slopes. If the point x was obtained in step 909, the system uses it as the point of expansion. The system also computes an approximation $J^C$ for the center of J(x,X) and an approximate inverse B of $J^C$. The system additionally computes M(x,X) BJ(x,X) and r(x)=−Bf(x) (step 910).

Note that the system computes B using a "special procedure" so that a result B is computed even if $J^C$ is singular. When using the Gauss-Seidel method, we can regard preconditioning as an effort to compute a matrix that is diagonally dominant. Even when $A^C$ is singular, we can generally compute a matrix B such that some diagonal elements dominate the off-diagonal elements in their row. This improves the performance of Gauss-Seidel. To compute B when $A^C$ is singular, we can begin the Gaussian elimination procedure. When a pivot element is zero, we replace it by some small quantity and proceed. This enables us to complete the elimination procedure and compute a result B. A similar step can be used if a triangular factorization method is used to try to invert $A^C$.

For further reference, the system saves X as $X^{(2)}$. At this point, if M(x,X) is regular, the system computes the hull of the set of points y satisfying M(x,X)(y−x)=r(x) (see Hansen, E. R., 1988, Bounding the solution of interval linear equations, SIAM J. Numer. Anal., 28, 1493–1503). If M(x,X) is irregular, the system computes a bound on this set using one step of the Gauss-Seidel method. In either case, the system denotes the resulting box by Y. If Y∩X is empty, the system goes to step 901. Otherwise, the system replaces X by Y∩X. (step 911).

Next, the system repeats step 903 (step 912).

If the Gauss-Seidel method was used in step 911, and if the box was sufficiently reduced, the system returns to step 911 (step 913).

If Criterion C discussed with reference to FIG. 6 above is satisfied, the system records X as a solution and goes to step 901 (step 914).

Using B from step 910, the system next determines the analytically preconditioned function Bf(x) (see Hansen, E. R., 1992, Preconditioning linearized equations, Computing, 58, 187–196). The system then applies term consistency to solve the i-th equation of Bf(x)=0 to bound $x_j$ for (j=1, . . . , n). If any result is empty, the system goes to step 901 (step 915).

The system then repeats step 903 (step 916).

Next, the system applies box consistency to solve the ith equation of the analytically preconditioned system Bf(x)=0 to bound $x_j$ for (j=1, . . . , n). If any result is empty, the system goes to step 901 (step 917).

Next, the system repeats step 903 (step 918).

If the Newton method in step 911 reduced the width of the box $X^{(2)}$ by a factor of eight or more, the system goes to step 908 (step 919).

If X is a sufficiently reduced version of the box $X^{(1)}$, the system goes to step 901 (step 920).

Otherwise, the system splits X and then proceeds to step 901 (step 921).

Note that after termination in step 901, bounds on all solutions of f(x) in the initial box $X^{(0)}$ have been recorded. A bounding box X recorded in step 903 satisfies the conditions w(X)≦$\epsilon_X$ and width(f(x))≦$\epsilon_F$ specified by the user. A box X recorded in step 913 approximates the best possible bounds that can be computed with the number system used.

Process of Solving a System of Equations in Fixed-Point Form (x=F(x))

Figure 10:
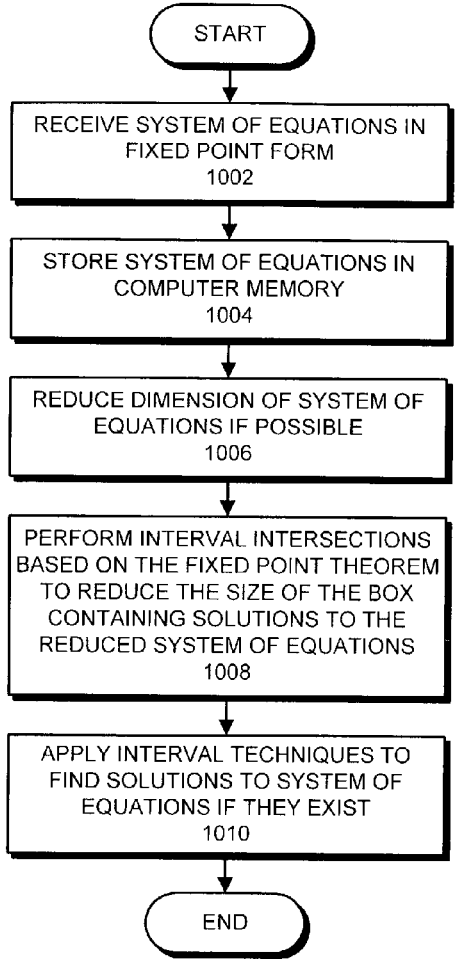
FIG. 10 presents a flow chart illustrating the process of solving a system of equations in fixed point for in accordance with an embodiment of the present invention.

FIG. 10 presents a flow chart illustrating the process of solving a system of equations in fixed-point form in accordance with an embodiment of the present invention. Note that a system in fixed-point form can be put into the form x=F(x). The system starts by receiving a representation of the system of equations in fixed-point form (step 1002). Next, the system stores the representation in a memory in the computer system (step 1004).

If possible, in order to reduce the dimension of the system, the system then performs algebraic manipulations on the system of equations to eliminate variables from the system of equations, (step 1006). This process is described in more detail below with reference to FIG. 11. The system also performs interval intersections based on the Brouwer Fixed-Point Theorem to reduce the size of the box containing solutions to the reduced system of equations (step 1008). Next, the system applies interval techniques to find solutions to the system of equations if they exist, as is described above with reference to FIGS. 1–9 (step 1010). For example, the system can apply term consistency over a subbox X, and can then exclude any portion of the subbox X that violates term consistency.

Figure 11:
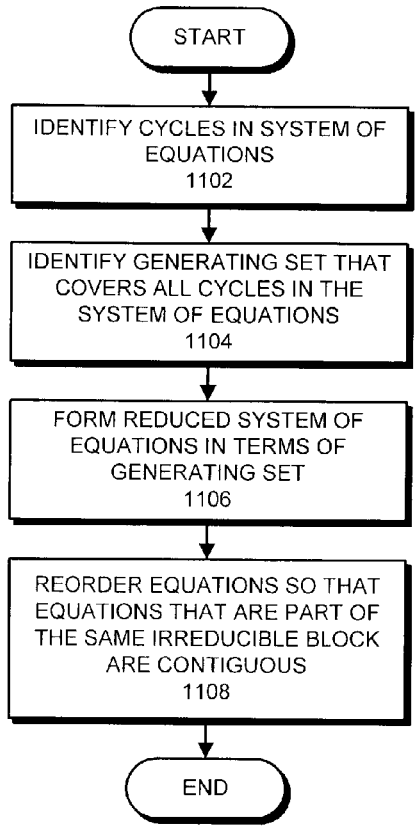
FIG. 11 presents a flow chart illustrating the process of reducing the dimension of a system of equations in accordance with an embodiment of the present invention.

FIG. 11 presents a flow chart illustrating the process of reducing the dimension of a system of equations in accordance with an embodiment of the present invention. The system starts by identifying cycles in the system of equations (step 1102). Next, the system identifies a "generating set" of variables that covers all cycles in the system of equations (step 1104). The system then forms a reduced system of equations in terms of the generating set (step 1106). During this process, the system reorders the equations so that equations that are part of the same irreducible block are contiguous (step 1108).

Hence, the above-described process involves: (1) reducing the dimension of the system of equations; (2) performing interval intersections; and (3) applying interval techniques to find solutions to the system of equations.

Details and examples of the above-described process are discussed in more detail below.

Reduction of Dimension

There are methods for reducing dimension for sparse systems of equations given in fixed point form. Such sparse systems occur naturally in economic models. For example, the largest of more than 200 "irreducible" (coupled) blocks in a model of the national economy of India has dimension 30, which can be reduced to an equivalent problem of dimension 3—that is three equations in three unknowns.

Such reductions in the number of variables in a system to be solved can improve efficiency of computational methods. Efficiency can be important no matter how fast machines are, because it frees up time on the machines to do other work as well, and hence be more productive.

In this discussion, we restrict the class of systems we are considering here to those which can be put into fixed point form, x=F(x). This form is typical for the systems of equations for the "endogenous" variables in an economic model, the other variables, the "exogenous" ones have given "input" values, and we wish to solve for the values of the endogenous variables.

In dynamic (time dependent) economic models, current values of endogenous variables are the unknowns in the equations of the system, and the coefficients may depend on previous values of the endogenous variables as well as on values of exogenous variables. Thus, we may need to solve such system for many time steps in a computer simulation of the economic system modeled by the equations.

For the exogenous variables we may be given probability density functions rather than numerical values, however we will defer consideration of this added complication to those who are working on such matters and consider here only numerical or interval coefficients.

We consider now systems given in the fixed point form $$x_1 = f_1(S_1)$$
$$x_2 = f_2(S_2)$$
$$\ldots$$
$$x_n = f_n(S_n)$$

where $S_1, S_2, \ldots, S_n$ are sub-vectors of $(x_1, x_2, \ldots, x_n)$.

For example, for the system $$x_1 = f_1(x_2)$$
$$x_2 = f_2(x_1, x_2)$$
$$x_3 = f_3(x_3)$$

we have $S_1 = (x_2)$, $S_2 = (x_1, x_2)$ and $S_3 = (X_3)$.

The first and simplest way to reduce dimension of systems of equations is to find all the disjoint irreducible blocks. For the example above, the first two equations involve only $x_1$ and $x_2$, while the last equation involves only $x_3$. Thus, we can split the system into the disjoint blocks (subsystems)

$$x_1 = f_1(x_2)$$
$$x_2 = f_2(x_1, x_2)$$

to be solved for $x_1$ and $x_2$, and $$x_3 = f_3(x_3)$$

to be solved for $x_3$. There is no coupling between these two blocks.

A block is "irreducible" if it cannot be split in this way into smaller blocks.

The largest of more than 200 irreducible blocks in a model of the national economy of India was found to be of dimension 30. These irreducible blocks were found with a computer program using a depth-first search.

Since we are not interested here in the meanings of the variables, we will use the generic names $x_1, x_2, \ldots, x_{30}$ for the variables and $c_1, c_2, \ldots$ for coefficients, and look at the "structure" of the system for the purpose of discussing ways to reduce the dimension of the system of equations to be solved. With these variable names, the system used to model the economy of India was given in the form $$x_1 = x_{28} - c_1$$
$$x_2 = c_2 - c_3 x_1$$
$$x_3 = c_4 - c_5 x_1$$
$$x_4 = c_6 - c_7 x_3$$
$$x_5 = c_8 - x_{25}$$
$$x_6 = c_9 x_{22}$$
$$x_7 = x_{29} - x_{25}$$
$$x_8 = c_{10} - x_2 - x_4 + x_5 + x_6 + c_{11} x_7$$
$$x_9 = \max(x_3, x_8)$$
$$x_{10} = c_{12} x_2$$
$$x_{11} = c_{13} x_9$$
$$x_{12} = c_{14} x_4$$
$$x_{13} = c_{15} + x_2 + x_9$$
$$x_{14} = c_{16} + x_{10} + x_{11}$$
$$x_{15} = x_{13} + x_4$$
$$x_{16} = x_{14} + x_{12}$$
$$x_{17} = c_{17} / x_{15}$$
$$x_{18} = c_{18} + c_{19} x_{16}$$
$$x_{19} = c_{20} + x_{16} - x_{22} + x_{23} - x_{18}$$
$$x_{20} = c_{21} + x_{21}$$
$$x_{21} = c_{22} - c_{23} x_{23}$$
$$x_{22} = c_{24} - x_{20}$$
$$x_{23} = c_{25} x_{24}$$
$$x_{24} = \max(0, x_{19})$$
$$x_{25} = c_{26} + c_{27} / x_{17}$$
$$x_{26} = c_{28} - x_{25}$$
$$x_{27} = x_{15} - x_5$$
$$x_{28} = x_{26} + x_{27} - c_{29}$$
$$x_{29} = c_{30} + x_6$$
$$x_{30} = c_{31} x_{24}$$

Notice that most of the expressions are linear in the components of $x = ((x_1, x_1, \ldots, x_{30})$. This will have no bearing on the method of reduction in dimension, from 30 to 3, that will be described and which only depends on a re-ordering of the equations in the system. The same procedure to be described could be applied even if all the equations were linear or all nonlinear.

The appearance of the max function makes the system non-differentiable, but we can use either interval slope functions instead of derivatives, as we will discuss in a later section, or c-set theory can be used to compute interval bounds on the so-called derivatives, when needed.

In order to motivate and prepare for a discussion of a general procedure for dimension reduction on sparse systems of this kind (in fixed point form), we first jump to the "bottom line" for this system. The result of the dimension reduction procedure to be explained, as applied to the system shown above, is as follows.

We can reduce the above system of 30 equations in 30 unknowns to the following system of 3 equations in 3 unknowns, again in fixed-point form $$X_{17} = F_1(x_{17}, x_{24}, x_{28})$$
$$X_{24} = F_2(x_{17}, x_{24}, x_{28})$$
$$X_{28} = F_3(x_{17}, x_{24}, x_{28})$$

where the functions $F_1$, $F_2$ and $F_3$ are defined as follows. The procedure for computing values of the three functions, given values (real or interval) for the arguments $x_{17}$, $x_{24}$ and $x_{28}$ is to evaluate the following expressions in the order shown by $x_1 = x_{28} - c_1$ $x_2 = c_2 - c_3 x_1$ $x_3 = c_4 - c_5 x_1$ $x_4 = c_6 - c_7 x_3$ $x_{10} = c_{12} x_2$ $x_{12} = c_{14} x_4$ $x_{23} = c_{25} x_{24}$ $x_{25} = c_{26} + c_{27}/x_{17}$ $x_{30} = c_{31} x_{24}$ $x_5 = c_8 - x_{25}$ $x_{21} = c_{22} - c_{23} x_{23}$ $x_{26} = c_{28} - x_{25}$ $x_{20} = c_{21} + x_{21}$ $x_{22} = c_{24} - x_{20}$ $x_6 = c_9 x_{22}$ $x_{29} = c_{30} + x_6$ $x_7 = x_{29} - x_{25}$ $x_8 = c_{10} - x_2 - x_4 + x_5 + x_6 + c_{11} x_7$ $x_9 = \max(x_3, x_8)$ $x_{11} = c_{13} x_9^2$ $x_{13} = c_{15} + x_2 + x_9$ $x_{14} = c_{16} + x_{10} + x_{11}$ $x_{15} = x_{13} + x_4$ $x_{16} = x_{14} + x_{12}$ $x_{18} = c_{18} + c_{19} x_{16}$ $x_{19} = c_{20} + x_{16} - x_{22} + x_{23} - x_{18}$ $x_{27} = x_{15} - x_5$ $F_1(x_{17}, x_{24}, x_{28}) = c_{17}/x_{15}$ $F_2(x_{17}, x_{24}, x_{28}) = \max(0, x_{19})$ $F_3(x_{17}, x_{24}, x_{28}) = x_{26} + x_{27} - c_{29}$.

Any solution $(x_{17}, x_{24}, x_{28})$ (or enclosure of it with intervals or lists of intervals we find) for the system $X_{17} = F_1(x_{17}, x_{24}, x_{28})$ $X_{24} = F_2(x_{17}, x_{24}, x_{28})$ $X_{28} = F_3(x_{17}, x_{24}, x_{28})$ can then be fed to the list above of expressions for computing the other variables or enclosures of them.

Next we discuss the general problem of finding such a reduction of dimension for any sparse system in fixed point form. The method merely involves a re-ordering the equations of the system.

Finding Generating Sets

We begin by considering a system of cyclic form $$x_1 = f_1(x_2)$$
$$x_2 = f_2(x_3)$$
$$\ldots$$
$$x_{n-1} = f_{n-1}(x_n)$$

$x_n = f_n(x_1)$

This is an irreducible (coupled) system, but for such a cyclic system, if we know the value of any one of the variables, then we can find the values of the remaining variables by evaluating—in reverse order for this example (bottom up and back around)—each of the functions in the system. Any sub-vector $(x_j)$ "generates" all the rest, for this type of system. In the example discussed above, we found that $(x_{17}, x_{24}, x_{28})$ was a "generating set".

In general, a system of the form $$x_1 = f_1(S_1)$$
$$x_2 = f_2(S_2)$$
$$\ldots$$
$$x_n = f_n(S_n)$$

where $S_1, S_2, \ldots, S_n$ are sub-vectors of $(x_1, x_1, \ldots, x_n)$ will have many "generating sets", each representable by a set of indices J such that the entire solution $x = (x_1, x_2, \ldots x_n)$ can be generated from the values of the variables with indices in J simply by evaluating each $f_j$ once in some appropriate order.

Of course, the union S of the indices in $S_1$ for all $i = 1, \ldots, n$ is always a generating set. What we seek is a subset of S that is a generating set with as few elements as possible. The number of those elements is the reduced dimension. In the example above, we reduced the dimension from 30 to 3. After this general discussion, we will give two more illustrations, one a reduction from dimension 99 to 6, the other from 83 to 1.

First let's agree on some notation and a few definitions, and look at some properties of generating sets. J is "locally minimal" if we cannot delete any element of J and still have a generating set, and is "globally minimal" if there is no generating set with fewer elements. It will be seen by examples that there may be more than one globally minimal generating set.

Clearly, a globally minimal generating set is also locally minimal. The converse is false as the following example shows. It follows that we cannot necessarily reduce dimension by simply deleting elements from generating sets that are larger than globally minimal. Consider a system of the following form, and notice the corresponding abbreviated tabular notation involving only indices, which we will use for the subsequent examples.

| | |
|---|---|
| $x_1 = f_1(x_2)$ | 1 ← 2 |
| $x_2 = f_2(x_3)$ | 2 ← 3 |
| $x_3 = f_3(x_4)$ | 3 ← 4 |
| $x_4 = f_4(x_1, x_5)$ | 4 ← 1, 5 |
| $x_5 = f_5(x_2, x_6)$ | 5 ← 2, 6 |
| $x_6 = f_6(x_5, x_7)$ | 6 ← 5, 7 |
| $x_7 = f_7(x_2, x_3, x_4, x_5, x_6)$ | 7 ← 2, 3, 4, 5, 6 |

It is not hard to show that (1,5,6) is a locally minimal generating set which is not globally minimal, and that there are exactly three globally minimal generating sets, namely (2,6), (3,6) and (4,6).

We can find generating sets by looking for cycles in the system. Such cycles of indices can be found by a computer using algorithms such as Knuth's topological sort. At least one element of each cycle must be in any generating set. If we find a few cycles, we can then pick an element from each and test whether we have a generating set.

To see whether or not a set J of indices is a generating set, we go through the remaining indices, after deleting those in J, and one at a time augment J by any index that can be generated by the ones so far accumulated until we have them all, or find one we cannot reach.

If we find a number of disjoint cycles, then a globally minimal generating set must have at least that number. A good choice for a trial generating set seems to be to pick elements (if any) in the intersections of cycles found plus one from each cycle disjoint from the others. In addition, it seems to be most efficient to look for short cycles first, as they are usually easier to find than long ones. At the other extreme, the cyclic system discussed at the beginning of this section has only one cycle, and it is of maximum length n.

Returning to the system of 30 equations discussed above, in an irreducible block of equations in the model for the national economy of India, we can identify cycles, to help find generating sets of indices. To identify a cycle, we pick an index, say $j_1$, that occurs in any $S_i$ then find an $S_j$ that contains i, and so on until we come back to $j_1$, which must always happen in n or fewer steps. We find, for instance, the cycles {28→2→13→15→27→28}
{3→4→15→27→28→1→3}
{24→30→21→20→22→19→24}
{17→25→7→8→9→11→14→16→17}
{8→9→11→14→16→17→25→5→8}
{19→24→23→19}

There may be many more than those. Often, cycles found will have elements in common. Sometimes one is found that is disjoint from others. Note that it can be shown that a generating set must have non-empty intersection with every cycle.

We are interested in finding a small generating set. So we look for the smallest set we can find that has non-empty intersection with each of the cycles we have found. J={17, 24, 28} is such a set. Since the second, third and fourth cycle shown above are mutually disjoint, a globally minimal generating set must have at least three elements. We check that {17, 24, 28} does in fact generate all the indices, so as it happens here we have found a globally minimal generating set for the given system.

Using this result, we re-order the equations in the system and, as discussed earlier, we can deal with the system of 30 equations in 30 unknowns as if it were a system of 3 equations in 3 unknowns.

While we have found a globally minimal generating set for the example discussed, the important thing about a generating set is not that it is globally minimal, but that it affords reduction in the dimension of the problem. In our example, the reduction was from 30 to 3.

There are many ways to find a generating set besides the method already discussed. For example, we could begin with $S_1$, which generates $x_1$, and examine in turn each of the sets $S_2, \ldots, S_n$ to find which (if any) of them are contained in the union of $S_1$ and $x_1$. We can adjoin all corresponding variables on the left hand sides of the system $$x_1 = f_1(S_1)$$
$$x_2 = f_2(S_2)$$
$$\ldots$$
$$x_n = f_n(S_n)$$

where $S_1, S_2, \ldots, S_n$ are sub-vectors of $(x_1, x_2, \ldots x_n)$ to the set generated by $S_1$, and repeat this procedure until no others can be added. If the whole set of components of $(x_1, x_2, \ldots, x_n)$ has not yet been produced, we can adjoin a missing variable, and repeat the procedure. In such a way we can always find a generating set. Note that a number of good heuristics for finding small generating sets exist.

The problem of finding what we are calling "minimal generating sets", is equivalent to problems in graph theory referred to in various ways as finding a minimal set of "loop variables", "spike variable", "cut-sets", "feedback vertex sets", "tear sets", etc. In the general case of non-sparse systems of equations, such problems are known to be NP-complete, which only means that a completely general algorithm for all systems may be extremely slow on some non-sparse systems of high dimension. On the other hand, the systems which occur in certain domains, such as economic models, may be of high dimension, but are typically very sparse, and typically break easily into smaller irreducible blocks, from which the methods discussed above rather easily find minimal generating sets, resulting in substantial reduction of dimension in the systems to be solved.

NP-completeness for the general non-sparse problem is irrelevant to the application of the methods to particular classes of practical problems, which typically involve very sparse systems.

Reduction of Domain by Interval Intersections

We are considering systems of the form $$x_1 = f_1(S_1)$$
$$x_2 = f_2(S_2)$$
$$\ldots$$
$$x_n = f_n(S_n)$$

where $S_1, S_2, \ldots, S_n$ are sub-vectors of $(x_1, x_2, \ldots, x_n)$. Such systems are ideally expressed for domain reduction using interval intersections.

Suppose we seek solutions to the system that lie in a "box" (interval vector) $X=(X_1, X_2, \ldots, X_n)$ where, for $i=1, \ldots, n$, $X_i$ is a given interval $X_i=[X_i^L, X_i^R]$ with left and right endpoints $X_i^L \leq X_i^R$.

Let $F_1(Y)$ be an interval extension of $f_1(x)$. That is, for all $i=1, \ldots n$, $F_1(Y)$ is an interval valued function of an interval vector-valued argument $Y=(Y_1, Y_2, \ldots, Y_n)$ with the enclosure property $f_1(x) \in F_1(Y)$ for all $x \in Y$ and all $Y$ in the common domain of the functions $f_1(x)$, $i=1, \ldots, n$.

Finally, let $S_1^1$ be the interval sub-vector of $Y$ corresponding to $S_1$, the sub-vector of $x$ giving the arguments of $f_1$ which actually occur in the sparse system being considered.

Suppose we have already applied methods discussed in the previous section for reduction of dimension, which only amount to row interchanges in $$x_1 = f_1(S_1)$$
$$x_2 = f_2(S_2)$$
$$\ldots$$
$$x_n = f_n(S_n)$$

say to the new ordering $$x_{j1} = f_{j1}(S_{j1})$$
$$x_{j2} = f_{j2}(S_{j2})$$
$$\ldots$$
$$x_{jn} = f_{jn}(S_{jn})$$

If we seek solutions to the system which lie in a box $X$, that is $x_1 \in X_1$, then we can reduce that box in the following way, before doing any further computations to find solutions.

To simplify notation, suppose we first re-name the components of $x$ and $f$ and $S$ by replacing the index $j_1$ by just $i$, so that we can write the system with reduced dimension itself as $$x_1 = f_1(S_1)$$
$$x_2 = f_2(S_2)$$
$$\ldots$$
$$x_n = f_n(S_n)$$

Now we can proceed as follows. Using interval evaluations, compute in the order shown $$X_1^* = X_1 \cap F_1(S_1^1)$$
$$X_2^* = X_2 \cap F_2(S_2^1)^*$$
$$\ldots$$
$$X_n^* = X_n \cap F_n(S_n^1)^*$$

where the * in $F_1(S_1^1)^*$ means we update the interval arguments from $X_j$ to $X_j^*$ as soon as they are available. It is easy to program and adds very little time to the computation.

This is a simple application of the idea of "constraint propagation". One could iterate the procedure by going through the list of expressions one or more additional times performing component-wise intersections at each expression. Whether this produces any significant further narrowing of the domain depends on properties of the particular system.

With this "domain reduction", we may have a smaller box in which to search for solutions to the system, namely $X^* = (X_1^*, X_2^*, \ldots, X_n^*)$ instead of $X$. Because of the intersections, $X^*$ certainly cannot be any bigger than $X$. Furthermore, if it should happen that any of the intersections turns out to be empty, then the computation has proved there are no solutions in $X$.

Interval Methods for Reduced Systems

After we have reduced the both the dimension and the domain for a system in fixed point form, we can then apply any one of a number of known interval methods to seek a list of small boxes enclosing the set of solutions (if any—or prove there are none) (see "Global Optimization Using Interval Analysis" by Eldon R. Hansen, Marcel Dekker, Inc., 1992.).

In particular, hull consistency can be used. We start with the problem of seeking the solutions in a box $X$ of a system in fixed point form $$x_1 = f_1(S_1)$$
$$x_2 = f_2(S_2)$$
$$\ldots$$
$$x_n = f_n(S_n)$$

where $S_1, S_2, \ldots, S_n$ are sub-vectors of $(x_1, x_2, \ldots, x_n)$.

If the result of applying the method described in the section above has reduced the dimension of a given system, it produces a re-ordering of the given system, which after re-naming variables, is again of the same form, but has the property that we have distinguished a sub-vector of $x$, $v=(v_1, v_2, \ldots, v_k) = (x_{n-k+1}, x_{n-k+2}, \ldots, x_n)$ of dimension $k<n$ such that the re-ordered system defines a mapping $G: R^k \to R^k$ whose k rows are the last k rows of the re-ordered system. Furthermore, the functions $f_1, f_2, \ldots, f_{n-k}$ can be evaluated in the order given in the re-ordered system, starting with a value (real or interval) of $v$. From this point of view the system will look like $$x_1 = f_1(S_1)$$
$$x_2 = f_2(S_2)$$
$$\ldots$$
$$x_{n-k} = f_{n-k}(S_{n-k})$$
$$x_{n-k+1} = v_1 = G_1(v_1, v_2, \ldots, v_k) = f_{n-k+1}(S_{n-k+1})$$
$$x_{n-k+2} = v_2 = (G_2(v_1, v_2, \ldots, v_k) = f_{n-k+2}(S_{n-k+2})$$
$$\ldots$$
$$x_n = v_n = G_n(v_1, v_2, \ldots, v_k) = f_n(S_n)$$

We can cast the problem into standard form $F(v)=0$ with $F: D \subset R^k \to R^k$ for using interval Newton-like methods, with either partial derivatives or interval slope functions, as needed, either for real or interval arguments of the functions, by defining $F(v)=v-G(v)$ with $G$ defined as above.

We can find the needed partial derivatives or "slope functions" by applying standard procedures line by line to the functions shown in the definition of the components of G, for instance using the Chain Rule and formulas for derivatives or slopes of elementary operations, in a way similar to dealing with a code list in "Automatic Differentiation" also called "Computational Differentiation".

It is important to note also that after having applied the technique of domain reduction described above, we can start the interval method with the reduced box X* instead of X, because any solution which is in X is also in X*.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. For example, although the present invention describes the use of derivatives in certain situations, it is often possible to use slopes instead of derivatives.

Additionally, the above disclosure is not intended to limit the present invention. The scope of the present invention is defined by the appended claims.

What is claimed is:

1. A method for using a computer system to solve a system of equations in fixed-point form, comprising:
    receiving a source code for performing interval calculations;
    compiling the source code into an executable code;
    receiving the system of equations in fixed-point form, wherein the system of equations is specified using intervals, wherein the intervals bound measurement errors and machine-rounding errors;
    storing the system of equations in a computer memory; and
    executing the executable code to:
        reduce the dimension of the system of equations, when possible, by eliminating variables in the system of equations to produce a reduced system of equations thereby reducing the computation time required by the computer system to solve the system of equations,
        perform interval intersections based on the Fixed Point theorem to reduce the size of a box containing solutions to the reduced system of equations thereby reducing the size of the computer memory required to store the system of equations, and to
        apply interval techniques to find solutions to the system of equations, when such solutions exist, wherein the interval techniques are performed by a hardware interval computation unit, and wherein the solutions to the system of equations include bounding of measurement errors and machine-rounding errors.

2. The method of claim 1, wherein applying interval techniques involves:
    applying term consistency over a subbox X; and
    excluding any portion of the subbox X that violates term consistency.

3. The method of claim 1, wherein reducing the dimension of the system of equations involves:
    identifying cycles in the system of equations;
    identifying a generating set of variables that covers all cycles in the system of equations; and
    forming the reduced system of equations by expressing the system of equations in terms of the generating set.

4. The method of claim 3, wherein reducing the dimension of the system of equations also involves reordering the system of equations so that equations that are part of the same irreducible block are contiguous.

5. The method of claim 1, wherein performing the interval intersections involves performing component-wise interval intersections for equations in the reduced system of equations.

6. The method of claim 5, wherein performing the interval intersections involves updating interval arguments as soon as updated values for the interval arguments are available.

7. A computer-readable storage medium storing instructions that when executed by a computer cause the computer to perform a method for using a computer system to solve a system of equations in fixed-point form, wherein the computer-readable storage medium can be any device that can store code and/or data for use by a computer system, the method comprising:
    receiving a source code for performing interval calculations;
    compiling the source code into an executable code;
    receiving the system of equations in fixed-point form, wherein the system of equations is specified using intervals, wherein the intervals bound measurement errors and machine-rounding errors;
    storing the system of equations in a computer memory; and
    executing the executable code to:
        reduce the dimension of the system of equations, when possible, by eliminating variables in the system of equations to produce a reduced system of equations thereby reducing the computation time required by the computer system to solve the system of equations,
        perform interval intersections based on the Fixed Point theorem to reduce the size of a box containing solutions to the reduced system of equations thereby reducing the size of the computer memory required to store the system of equations, and to
        apply interval techniques to find solutions to the system of equations, when such solutions exist, wherein the interval techniques are performed by a hardware interval computation unit, and wherein the solutions to the system of equations include bounding of measurement errors and machine-rounding errors.

8. The computer-readable storage medium of claim 7, wherein applying interval techniques involves:
    applying term consistency over a subbox X; and
    excluding any portion of the subbox X that violates term consistency.

9. The computer-readable storage medium of claim 7, wherein reducing the dimension of the system of equations involves:
    identifying cycles in the system of equations;
    identifying a generating set of variables that covers all cycles in the system of equations; and
    forming the reduced system of equations by expressing the system of equations in terms of the generating set.

10. The computer-readable storage medium of claim 9, wherein reducing the dimension of the system of equations also involves reordering the system of equations so that equations that are part of the same irreducible block are contiguous.

11. The computer-readable storage medium of claim 7, wherein performing the interval intersections involves performing component-wise interval intersections for equations in the reduced system of equations.

12. The computer-readable storage medium of claim 11, wherein performing the interval intersections involves updating interval arguments as soon as updated values for the interval arguments are available.

13. An apparatus that uses a computer system to solve a system of equations in fixed-point form, comprising:
- a receiving mechanism for receiving a source code for performing interval calculations;
- a compiling mechanism for compiling the source code into an executable code;
- a memory for storing the system of equations in fixed-point form, wherein the system of equations is specified using intervals, wherein the intervals bound measurement errors and machine-rounding errors;
- wherein the executable code includes:
  - a reduction mechanism that is configured to reduce the dimension of the system of equations, when possible, by eliminating variables in the system of equations to produce a reduced system of equations thereby reducing the computation time required by the computer system to solve the system of equations
  - an intersection mechanism that is configured to perform interval intersections based on the Fixed Point theorem to reduce the size of a box containing solutions to the reduced system of equations thereby reducing the size of the memory required to store the system of equations and
  - a hardware interval computation unit configured to apply interval techniques to find solutions to the system of equations, when such solutions exist, wherein the solutions to the system of equations include bounding of measurement errors and machine-rounding errors.

14. The apparatus of claim 13, wherein the interval mechanism is configured to:
- apply term consistency over a subbox X; and to
- exclude any portion of the subbox X that violates term consistency.

15. The apparatus of claim 13, wherein the reduction mechanism is configured to:
- identify cycles in the system of equations;
- identify a generating set of variables that covers all cycles in the system of equations; and to
- form the reduced system of equations by expressing the system of equations in terms of the generating set.

16. The apparatus of claim 15, wherein the reduction mechanism is additionally configured to reorder the system of equations so that equations that are part of the same irreducible block are contiguous.

17. The apparatus of claim 13, wherein the intersection mechanism is configured to perform component-wise interval intersections for equations in the reduced system of equations.

18. The apparatus of claim 17, wherein the intersection mechanism is configured to update interval arguments as soon as updated values for the interval arguments are available.

* * * * *

UNITED STATES PATENT AND TRADEMARK OFFICE
CERTIFICATE OF CORRECTION

| | | |
|---|---|---|
| PATENT NO. | : 7,222,145 B2 | Page 1 of 1 |
| APPLICATION NO. | : 10/211624 | |
| DATED | : May 22, 2007 | |
| INVENTOR(S) | : G. William Walster et al. | |

It is certified that error appears in the above-identified patent and that said Letters Patent is hereby corrected as shown below:

On The Title Page, Item (57) lines 4-5
    Please insert the word --in-- between the word "representation" and the phrase "a computer memory" in the second sentence of the abstract, so that the entire second sentence of the abstract reads as follows:

During operation, the system receives a representation of the equations in fixed-point form and stores the representation in a computer memory.

Signed and Sealed this

Seventh Day of August, 2007

JON W. DUDAS
*Director of the United States Patent and Trademark Office*